United States Patent [19]

Crespo-Ruiz et al.

[11] Patent Number: 5,046,814
[45] Date of Patent: Sep. 10, 1991

[54] LONGITUDINAL SEALING DEVICE FOR AN OPTICAL CABLE CORE

[75] Inventors: Francois Crespo-Ruiz, Paris; Jacques Cachot, Saint Michel Sur Orge; André Pelet, Maurepas, all of France

[73] Assignee: Alcatel Cit, Paris, France

[21] Appl. No.: 626,153

[22] Filed: Dec. 12, 1990

[30] Foreign Application Priority Data

Dec. 13, 1989 [FR] France .................................. 8916499

[51] Int. Cl.$^5$ ................................................. G02B 6/44
[52] U.S. Cl. ........................ 385/113; 385/109; 385/53
[58] Field of Search ........................... 350/96.20–96.23

[56] References Cited

U.S. PATENT DOCUMENTS 4,707,065  11/1987  Jenkins .............................. 350/96.20
4,729,624  3/1988  Kakii et al. ........................ 350/96.20

FOREIGN PATENT DOCUMENTS 31271135  1/1983  Fed. Rep. of Germany .
2435845  4/1980  France .
2187304  9/1987  United Kingdom .

Primary Examiner—Akm Ullah
Attorney, Agent, or Firm—Sughrue, Mion, Zinn, Macpeak & Seas

[57] ABSTRACT

This device is interposed between two lengths of an optical fiber lead-in cable comprising a core constitution by a small diameter stainless steel tube containing a bundle of optical fibers comprises: a metal plug which is brazed to the end of one length of tube and which includes a barrel including a cavity whose diameter is not less than the diameter of the bundle of fibers and whose outside surface has a diameter which is greater than the diameter of the tube, said outside surface being provided with transverse grooves; a block of epoxy resin molded both over a portion of a bundle of fibers and over the barrel; the resin covering portions of the bundle both inside and outside the barrel; a sleeve fixed in sealed manner to the other length of tube; a clamping ring; a viscous hydrophobic liquid injected into the space remaining empty between the sleeve and the block of epoxy resin; and epoxy resin injected into the cavities inside the sleeve.

4 Claims, 1 Drawing Sheet

LONGITUDINAL SEALING DEVICE FOR AN OPTICAL CABLE CORE

The present invention relates to a longitudinal sealing device for the core of an optical cable, in particular for an under-sea link.

BACKGROUND OF THE INVENTION

The core of an optical cable is conventionally constituted by a stainless steel tube containing a bundle of optical fibers disposed loosely in the cavity of the tube. The tube is covered with a thick sheath of polyethylene. The tube provides mechanical protection for the bundle of fibers. In some cases it also serves as an electrical conductor for powering transmission equipment underwater, e.g. repeaters.

Such a cable must be proof against transverse ingress of water under very high pressure, and in addition it must also resist longitudinal propagation of water should ingress of water occur because of damage to the cable. Resistance to longitudinal propagation of water is conventionally obtained by filling the tube with a viscous hydrophobic material. However, such resistance is effective only after a certain length of intact cable. Where a cable accesses a repeater, there is not always a sufficient length of intact cable to guarantee sealing. In order to prevent water propagating inside a repeater, French patent application No. 2 595 149 teaches placing a longitudinal sealing device in the vicinity of each of the cable accesses to a repeater. Each repeater is provided with two short lead-in cables, each of which is terminated by a splice box for connection to a long cable. A longitudinal sealing device is inerted in each lead-in cable dividing it into two lengths. The prior sealing device comprises:

a block of plastic material molded mold over the end of the length of tube situated adjacent to the repeater, and over the optical fibers occupying a portion of the bundle situated between the two lengths of the tube; with the end of the length of tube situated adjacent to the repeater including a neck extending all around the tube for holding the block of plastic material on the end of the tube;

a metal sleeve surrounding the block of plastic material and brazed to the end of the length of tube situated adjacent to the splice box;

a metal plug threaded over the length of tube situated adjacent to the repeater so that the end of the tube projects beyond the metal plug to carry the block of plastic material; with the tube being brazed to the plug at its end furthest from the block of plastic material;

a clamping ring threaded over the sleeve for clamping the ring onto the metal plug, which plug has an outside thread; with final fixing of the sleeve and the plug (and also electrical continuity, where required) being ensured by weld spots; and a hydrophobic substance injected into the space that remains between the sleeve and the block of plastic material.

The neck around the tube has the function of engaging the block of plastic material molded onto the end of the tube in such a manner as to obtain durable sealing in spite of possible interstices which may be in engendered along the inside wall of the tube by the shrinkage to which the molded plastic material is subject. This device works well when the relative transverse dimensions of the tube and the bundle of fibers make it possible to provided a neck on the tube without the corresponding reduction in the inside diameter of the tube preventing the fibers from passing. For example it works well with a tube having outside and inside diameters of 4 mm and 2 mm respectively, and a bundle of fibers having a diameter of about 0.8 mm.

However, if a tube having significantly smaller transverse dimensions is used for a bundle of fibers having the same size, e.g. a tube having an outside diameter of 2.3 mm and an inside diameter of 1.5 mm, thereby reducing the size of the lead-in cables, then these small dimensions do not make it easy to ensure that the block of molded plastic material is held onto the end of the tube. It is no longer possible to make a neck of sufficient depth to hold the block of plastic material securely while retaining an inside diameter that is large enough to allow the bundle of fibers to pass therethrough.

An object of the invention is to provide a longitudinal sealing device which is practical and reliable, in particular for a cable core including a small diameter tube, e.g. a tube having an outside diameter of 2.3 mm and an inside diameter of 1.5 mm.

SUMMARY OF THE INVENTION

The invention provides a sealing device in which the plastic material molded on the end of a length of tube is held thereon by means of a part that is integral with the metal plug, with the tube being fixed to the metal plug by brazing.

According to the invention, a longitudinal sealing device for the core of an optical cable including a bundle of optical fibers disposed inside the cavity of a metal tube; the sealing device being interposed between a first length and a second length of the tube, and comprising:

holding means situated at one end of the first length of tube for the purpose of holding a plastic material;

a block of covering plastic material covering both the holding means and the optical fibers of the bundle over a portion of the bundle situated between the two lengths of tube;

a metal sleeve surrounding the block of plastic material and fixed in sealed manner to the end of the second length of tube; and a metal plug fixed to the end of the first length of tube and fixed in sealed manner to a mouth of the sleeve which it closes;

wherein the holding means for holding a plastic material comprise a barrel integral with the metal plug, said barrel having a cavity extending the cavity of the first length of tube and opening out from said barrel at the end thereof which is furthest from the first length of tube; the cross-section of said cavity being greater than the cross-section of the bundle of fibers, which bundle of fibers passes through said cavity; and the outside surface of said barrel including at least one transverse groove.

This sealing device causes no problems with installing the optical fibers in the tube, even if the inside diameter of the tube is small, since its inside diameter is not reduced. In addition, it holds the block of plastic material molded onto the barrel very securely since the outside surface of the barrel includes at least one transverse groove of sufficient depth to enable it to hold the plastic material securely.

The cavity of the barrel may be flared in shape, at least at its end situated adjacent to the second length of tube. The cavity of the barrel is thus conical in shape at its end on which the block of molded plastic material is situated. Consequently, the molded plastic material inside the barrel is also conical in shape, thereby maintaining very good sealing even in the event of the plastic material shrinking, since if water infiltration does occur, then the pressure of the water will cause the plastic material to deform by creep until its conical surface is firmly pressed against the conical surface of the cavity in the barrel. As a result, sealing against the wall of the barrel increases with increasing pressure.

The cavity of the barrel may be circular in section having a constant diameter over a certain length of the barrel starting from the end of the barrel situated adjacent to the first length of tube, and having a diameter which then increases along the barrel to the end of the barrel situated furthest from the first length of tube. This makes it possible to extend the zone of the bundle of fibers which is impregnated by the plastic material of the covering block, thereby lengthening the seepage distance for water along the bundle.

The metal plug may include a first hole of diameter substantially equal to the outside diameter of the tube, and a second hole extending the first hole and having a smaller diameter, thereby constituting a shoulder; with the first length of tube being placed inside the first hole in abutment against said shoulder, and being brazed to the plug at the mouth of the first hole; and the sleeve may include a first hole of diameter substantially equal to the outside diameter of the tube, and a second hole extending the first hole and of smaller diameter, thereby constituting a shoulder; with the second length of tube being placed in the first hole in abutment against said shoulder, and being brazed to the sleeve at the mouth of the first hole. This makes it possible to fix the two lengths of tube to the sealing device in particularly reliable manner since the pressure of the water in which the assembly is immersed exerts stress mainly on the shoulders and exerts little stress on the brazing.

BRIEF DESCRIPTION OF THE DRAWING

An embodiment of the invention is described by way of example with reference to the accompanying drawing, in which.

DETAILED DESCRIPTION

Figure 1:
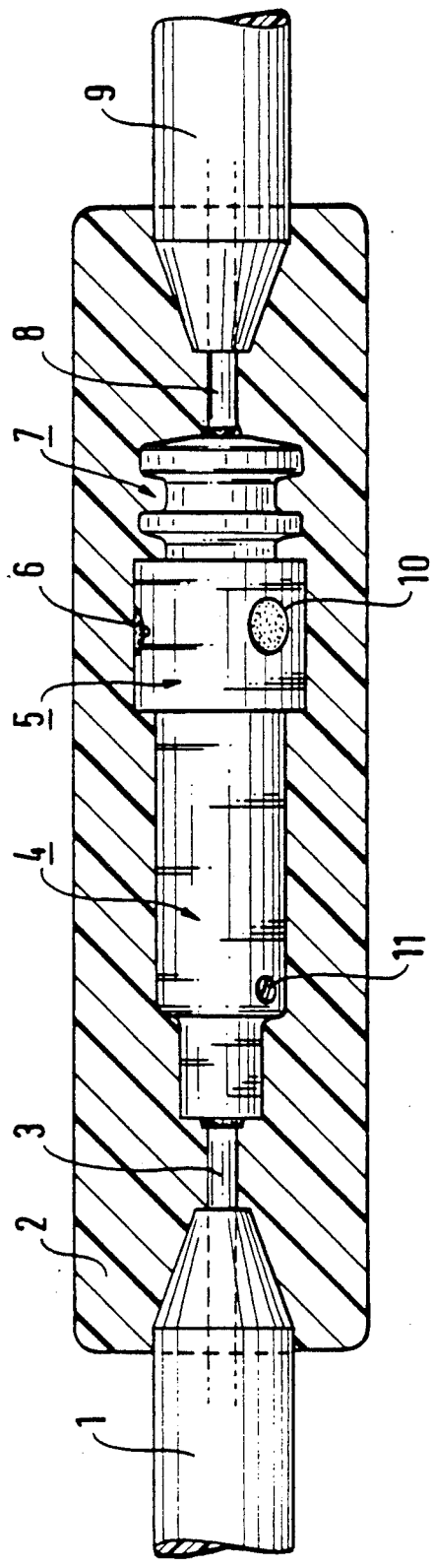
FIG. 1 is a view of said embodiment after removing only the layer of plastic material that surrounds the device.

The embodiment shown in FIG. 1 is interposed between two lengths 1 and 9 of an optical lead-in cable. The length 1 is connected to a splice box, and the length 9 is connected to a repeater. The lead-in cable essentially comprises: a thick sheath of plastic material; and a tube of stainless steel having an outside diameter of 2.3 mm and an inside diameter of 1.5 mm, for example. The cavity in the tube contains an optical fiber bundle 12 (not shown in FIG. 1) having a diameter of 0.8 mm, for example, and which is installed during the operations involved in making the sealing device. Before the optical fibers are installed, the optical lead-in cable is cut in two.

The end of the length 1 of the lead-in cable is stripped of its plastic sheath to reveal a certain length of its stainless steel tube 3. The length 9 of the lead-in cable is similarly stripped of its plastic sheath to reveal a certain length of its stainless steel tube 8. The length of tube 3 is brazed to one end of a metal sleeve 4, and the length of tube 8 is brazed to one end of a metal plug 7. The plug 7 closes the sleeve 4 by being clamped against the sleeve 4 by a clamping ring 5.

The clamping ring has two openings 6 and 10 which are used during manufacture of the device to improve the connection between the sleeve 4 and the plug 7 in a manner described below. These openings are subsequently used to fill the cavities inside the clamping ring 5 with epoxy resin, thereby giving the ring a smooth outside surface which is more suitable for receiving overmolding. The sleeve 4 includes a small orifice which is closed by a grub screw 11. This orifice is used for filling the empty space inside the sleeve with a viscous hydrophobic liquid.

The sleeve 4, the ring 5, and the plug 7 are all made of cupro-beryllium. They provide mechanical continuity and, where applicable, electrical continuity for the stainless steel tube of the optical lead-in cable. The device as a whole is embedded in a block 2 of molded polyethylene.

Figure 2:
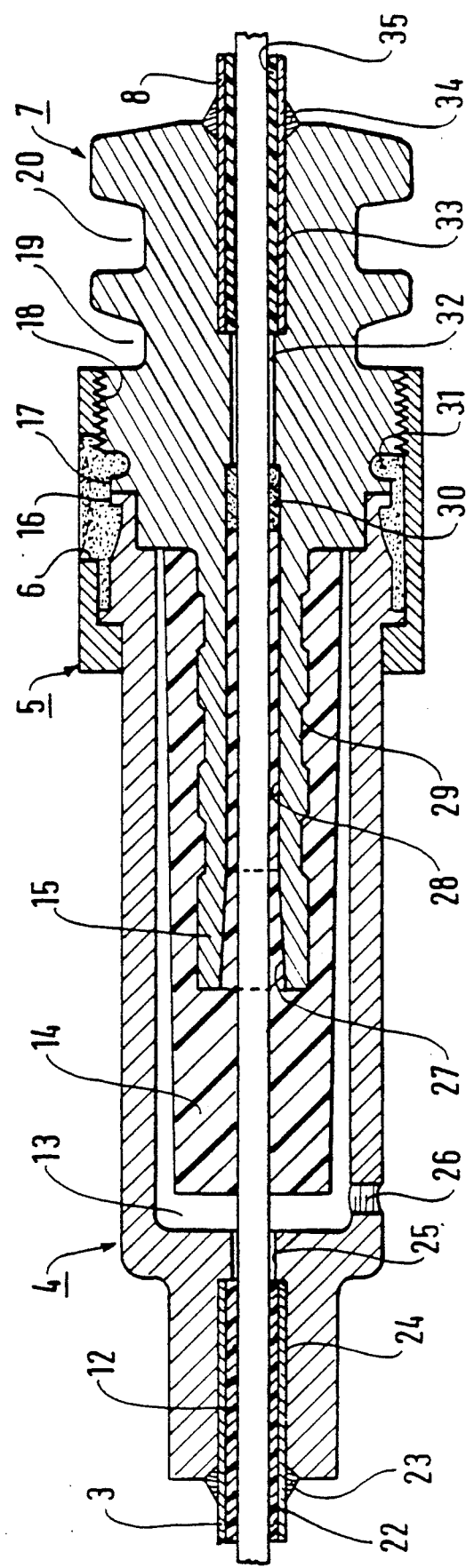
FIG. 2 is a section view showing the inside of this embodiment, on a larger scale.

FIG. 2 is a longitudinal section on a larger scale through this embodiment with the polyethylene block 2, with the sheaths covering the two lengths 1 and 9 of the optical cable lead-in, and the viscous hydrophobic liquid all being omitted. At one end the sleeve 4 has a cylindrical hole 24 of diameter substantially equal to the outside diameter of the length of tube 3. This hole is extended by a hole 25 having a diameter which is smaller than that of the hole 24, but larger than that of the fiber bundle 12, e.g. close to the inside diameter of the length of tube 3. The length of tube 3 bears against a shoulder constituted by the change in diameter between the holes 24 and 25, and it is fixed to the sleeve 4 where the hole 24 opens out by a fillet of brazing 23.

The optical fiber bundle 12 passes without interruption through the entire sealing device. In the length 1 of the lead-in cable, it is contained in the length of tube 3 and is protected therein by a polytetrafluorethylene (PTFE) sheath 22. The sheath 22 is short since it is intended only to protect the optical fibers against heating in the zone which is subject to the heat of molding the plastic block 2. In the length 9 of the lead-in cable, the bundle 12 is contained inside the length of tube 8 where it is protected by a sheath 35 analogous to the sheath 32.

The inside of the sleeve 4 contains a covering block 14 of plastic material covering a barrel 15 through which the bundle 12 passes and which extends the metal plug 7. It covers a portion of the bundle of fibers 12 both outside and inside the barrel 15. There remains an empty space 13 between the block 14 and the sleeve 4. This space is filled with a viscous hydrophobic liquid injected therein via a hole 26 formed through the sleeve 24 and subsequently closed by the grub screw 11. The mouth of the sleeve 4 adjacent to the plug 7 is surrounded by a welding lip 16 which bears against a lip 17 of the plug 7. The plug 7 includes a threaded portion 18 onto which the clamping ring 5 is screwed. The clamping ring bears against a shoulder of the sleeve 4 which enables the ring to rotate while urging the sleeve 4 against the plug 7. The bundle of optical fibers 12 passes through the plug 7 by passing successively through the cavity of the barrel 15, then through a hole 32, and then through a hole 33.

The end of the cavity in the barrel 15 is flared away from the first length of tube. Its cross-section is always greater than that of the bundle of optical fibers 12. This cavity comprises a first portion 27 of length equal to approximately one-fifth of the depth of the barrel 15 in which the diameter of the barrel 15 increases going towards its mouth. In this example, the depth of the barrel 15 is 24 mm and its portion 27 in the form of a truncated cone has a minimum diameter of 2 mm and flares at an angle of 6°. The portion 27 makes it possible to maintain sealing along the walls of the barrel should the plastic material shrink, by means of the self-locking effect of the conical surfaces under the action of the pressure that arises in the event of water infiltrating into the sleeve. The cavity includes a second portion 28 whose length corresponds to approximately four-fifths of the depth of the barrel and whose diameter is slightly greater than the inside diameter of the tube. In this example, the portion 28 has a diameter of 2 mm. It extends the zone of the bundle 12 which is impregnated by the plastic material of the block 14, thereby lengthening the seepage distance for water along the bundle of fibers 12.

The hole 32 which extends the portion 28 has a diameter which is approximately equal to the inside diameter of the tube. In this example, the diameter of the hole 32 is 1.5 mm. The difference in diameter between the hole 32 and the portion 28 of the cavity constitutes a shoulder for holding in place a pad 30 of foam or of packing. The pad 30 serves to prevent plastic material propagating during molding of the block 14. This plastic material fills the inside of the barrel 15 up to the pad 30 and consequently it impregnates the bundle 12 over the full length of the barrel 15.

The outside surface of the barrel 15 is generally cylindrical in shape and in this case its diameter is considerably greater than the diameter of the length of tube 8, e.g. its diameter is 4.5 mm. This outside surface is indented by transverse grooves 29 having a depth of 0.4 mm. The grooves can be made as deep as desired, merely by providing the barrel 15 with a wall of adequate thickness.

The diameter of the hole 33 is substantially equal to the diameter of the length of tube 8. The difference in diameter between the holes 32 and 33 constitutes a shoulder against which the length of tube 8 bears. The tube is fixed to the plug 7 by a fillet of brazing 34 at the mouth of the hole 33.

It may be observed that the shoulder formed at the boundary between the holes 33 and 32 and the shoulder formed at the boundary between the holes 24 and 25 withstand the major portion of the axial pressure exerted by the water in which the assembly is immersed, with these two shoulders thus limiting the stresses on the brazing fillets 34 and 23.

The portion of the plug 7 which extends beyond the clamping ring 5 has two transverse grooves 19 and 20 enabling the plug 7 to be anchored inside the block of plastic material 2, and extending the seepage distance for water.

The cavities that remain inside the ring 5 are filled with an epoxy resin 31.

This embodiment is obtained by the following steps:

prior to inserting the bundle of optical fibers 12, the cable lead-in is cut at the future location of the longitudinal sealing device;

the sheath of plastic material is removed from the ends of the two lengths 1 and 9 of the lead-in cable, thereby revealing a certain length of each of the lengths of tube 3 and 8;

lengths of sheath 22 and 35 are inserted in each of the lengths of tube;

the plug 7 is threaded over the length of tube 8 until it comes into abutment thereagainst, and the fillet of brazing 34 is applied;

the sleeve 4 has the clamping ring 5 fitted thereon and is itself fitted onto the end of the length of tube 3, with the fillet of brazing 23 then being applied;

the bundle of fibers 12 is threaded into the length of tube 8;

the pad 30 is placed in the bottom of the barrel 15;

a temporary mold is assembled around the barrel 15 having an inside volume which is slightly smaller than the volume of the sleeve 4;

epoxy resin is cast into this mold, with the resin being selected to avoid disturbing the transmission of light;

once the resin has set forming the block of plastic material 14, the mold is removed;

the bundle of fibers 12 is threaded along the length of tube 3 through the hole 25 of the sleeve 4 an the block of plastic material 14 is engaged inside the sleeve 4;

the sleeve 4 is assembled to the plug 7 by screwing the clamping ring 5 onto the plug 7;

the sleeve 4 and the plug 7 are welded together by electrical spot welding of the lips 16 and 17 through the openings 6 and 10 in the ring 5;

the cavities inside the clamping ring 5 are filled with epoxy resin so that the resin comes flush with the openings 6 and 10;

the space 13 inside the sleeve 4 is filled with a viscous hydrophobic liquid and then its filling orifice 26 is closed; and a block of polyethelene 2 is molded over the assembly constituted by the sleeve 4, the ring 5, the plug 7 and the bared portions of the lengths of tube 3 and 8, thereby re-establishing continuity of the sheath of plastic material which covers the lead-in cable, which sheath provides transverse sealing for the lead-in cable.

The scope of the invention is not limited to this particular embodiment. Numerous variants will occur to the person skilled in the art, in particular with respect to the barrel having a cavity whose diameter flares towards its open end, and with respect to making the transverse grooves in the outside surface of the barrel.

I claim:

1. A longitudinal sealing device for the core of an optical cable including a bundle of optical fibers disposed inside the cavity of a metal tube; the sealing device being interposed between a first length and a second length of the tube, and comprising:

holding means situated at one end of the first length of tube for the purpose of holding a plastic material;

a block of covering plastic material covering both the holding means and the optical fibers of the bundle over a portion of the bundle situated between the two lengths of tube;

a metal sleeve surrounding the block of plastic material and fixed in sealed manner to the end of the second length of tube; and a metal plug fixed to the end of the first length of tube and fixed in sealed manner to a mouth of the sleeve which it closes;

wherein the holding means for holding a plastic material comprise a barrel integral with the metal plug, said barrel having a cavity extending the cavity of the first length of tube and opening out from said barrel at the end thereof which is furthest from the first length of tube; the cross-section of said cavity being greater than the cross-section of the bundle of fibers, which bundle of fibers passes through said cavity; and the outside surface of said barrel including at least one transverse groove.

2. A device according to claim 1, wherein the cavity of the barrel is flared in shape, at least at its end situated adjacent to the second length of tube.

3. A device according to claim 2, wherein the cavity of the barrel is circular in section having a constant diameter over a certain length of the barrel starting from the end of the barrel situated adjacent to the first length of tube, and having a diameter which then increases along the barrel to the end of the barrel situated furthest from the first length of tube.

4. A device according to claim 1, wherein the metal plug includes a first hole of diameter substantially equal to the outside diameter of the tube, an a second hole extending the first hole and having a smaller diameter, thereby constituting a shoulder;

wherein the first length of tube is placed inside the first hole in abutment against said shoulder, and is brazed to the plug at the mouth of the first hole;

wherein the sleeve includes a first hole of diameter substantially equal to the outside diameter of the tube, and a second hole extending the first hole and of smaller diameter, thereby constituting a shoulder; and wherein the second length of tube is placed in the first hole in abutment against said shoulder, and is brazed to the sleeve at the mouth of the first hole.

* * * * *